United States Patent [19]

Biscop

[11] 4,276,909
[45] Jul. 7, 1981

[54] HEAT-RECOVERABLE WRAP-AROUND DEVICES

[76] Inventor: Francois Biscop, Strijdersstraat 3, 3200 Kessel-lo, Belgium

[21] Appl. No.: 159,499

[22] Filed: Jun. 16, 1980

Related U.S. Application Data

[63] Continuation of Ser. No. 971,559, Dec. 20, 1978, abandoned.

[30] Foreign Application Priority Data

Dec. 23, 1977 [GB] United Kingdom ............ 53704/77

[51] Int. Cl.³ .................. F16L 11/12; F16L 25/00; F16L 55/16
[52] U.S. Cl. .................. 138/167; 138/156; 138/163; 138/178; 428/36; 428/192; 428/913; 174/DIG. 8; 264/230; 264/249; 264/342 R; 29/447; 29/513
[58] Field of Search ............ 138/97, 99, 156, 163, 138/167, 178; 428/126, 189, 192, 36, 99, 913; 156/203, 217, 218; 53/442; 174/DIG. 8; 403/273; 229/93; 29/447, 513; 264/230, 249, 342 R

[56] References Cited

U.S. PATENT DOCUMENTS

| 1,063,144 | 5/1913 | Wallace | 229/93 X |
|---|---|---|---|
| 1,994,396 | 3/1935 | Kilner | 428/192 X |
| 2,025,918 | 12/1935 | Van Cleef | 156/218 |
| 3,093,448 | 6/1963 | Kirkpatrick et al. | 53/442 |
| 3,095,641 | 7/1963 | Siegel | 29/513 X |
| 3,379,218 | 4/1968 | Conde | 138/99 |
| 3,445,898 | 5/1969 | Goodrich | 264/230 X |
| 3,455,336 | 7/1969 | Ellis | 138/99 X |
| 3,530,898 | 9/1970 | Wilson | 138/99 |
| 3,542,077 | 11/1970 | Muchmore | 138/99 |
| 3,574,313 | 4/1971 | Tanaka | 138/99 |
| 3,783,086 | 1/1974 | Plummer | 138/99 |
| 3,959,052 | 5/1976 | Stanek | 428/36 |

FOREIGN PATENT DOCUMENTS

| 2332599 | 6/1977 | France | 138/99 |
|---|---|---|---|
| 1394496 | 5/1975 | United Kingdom | 53/442 |

Primary Examiner—James E. Bryant, III
Attorney, Agent, or Firm—Lyon & Lyon

[57] ABSTRACT

A heat-recoverable wrap-around device is made from heat-shrinkable sheet material, two opposed edges of which may be secured together by fasteners so as to form a sleeve prior to recovery. Each edge region is provided with a strip of rigid material lying generally in the plane of the sheet. The strips may be bonded or embedded within the sheet material, or positioned in terminal loops therein, and are preferably so designed that they can be deformed into an interlocking relationship which withstands the recovery forces.

29 Claims, 12 Drawing Figures

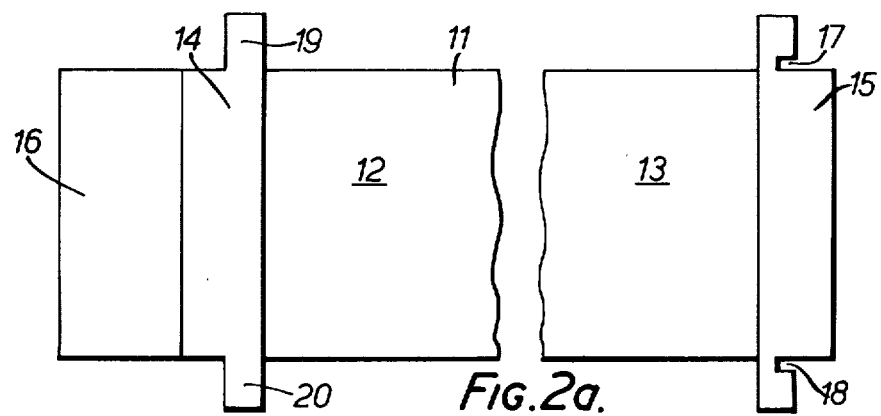
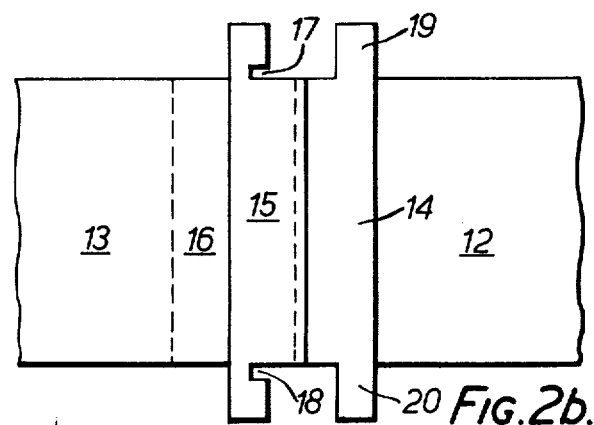
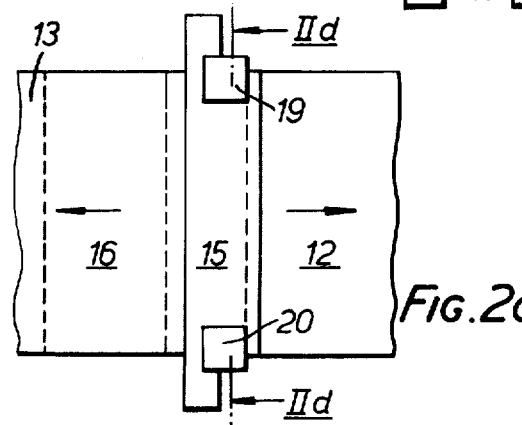
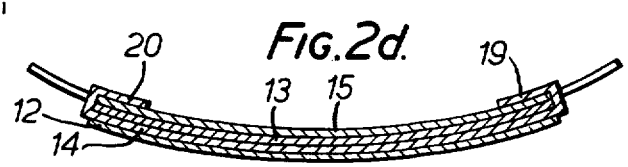

HEAT-RECOVERABLE WRAP-AROUND DEVICES

This is a continuation of application Ser. No. 971,559, filed Dec. 20, 1978, now abandoned.

This invention relates to heat-recoverable articles, especially so-called "wrap-around" articles.

Heat-recoverable articles, especially heat-shrinkable articles, are now widely used in many areas where insulation, sealing and encapsulation are required. Usually these articles recover, on heating, towards an original shape from which they have previously been deformed, but the term "heat-recoverable," as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles as described, for example, in British Pat. No. 1,440,524, an elastomeric member such as an outer tubular member is held in a stretched state by a second member, such as an inner tubular member, which, upon heating, weakens and thus allows the elastomeric member to recover.

Heat-shrinkable sleeves find many applications, especially in the connection and termination of wires, cables and pipes. However, there are other applications where it is desirable to provide a connecting, insulating or protective heat-recoverable member for elongated objects such as cables and pipes where the ends are not accessible or, if they are accessible, where it is undesirable to disconnect or otherwise displace them. For such applications so-called "wrap-around" sleeves have been developed. Basically these are heat-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protuberances adjacent to the overlapping edges of the heat-recoverable sheet. Various types of fastening means are described, for example, in U.S. Pat. No. 3,379,218, British Pat. Nos. 1,155,470; 1,211,988 and 1,346,479 and French Pat. Publication No. 2,332,599. In other applications the sheet may be held in the wrapped-up configuration during recovery by means of an adhesive which may, in some cases, be applied on site.

The previously proposed wrap-around devices have been successfully employed in many applications. However, problems have been encountered when the substrates are large. For example, the shrink forces in a large sleeve, e.g. of diameter of 200 mm or more, especially 600 mm or more, often exceed the strength of an extruded rail and channel type fastening. In addition, the need for what are often quite complex and bulky extruded profiles at the edge regions of the heat-recoverable sheet adds considerably to the cost, and, in some cases, the size of the completed fastening, which protrudes from the surface of the sleeve, has caused spatial problems, especially in cramped locations.

The present invention is based on our surprising observation that these problems can be significantly reduced, especially for large diameter sleeves, by forming the fastening means from strips of metal or similar rigid material which are provided along the length of the opposed and, usually, overlapping edges of the heat-shrinkable sheet material and which engage with each other and/or with one or more other members at or beyond the sides of the wrap-around assembly rather than across the width thereof.

Accordingly, the present invention provides a heat-recoverable wrap-around device made from heat-shrinkable sheet material, wherein the two regions of the sheet material which are secured together by a fastening means to form a sleeve prior to recovery are each provided with a strip of relatively rigid material, the strips lying generally in the plane of the heat-recoverable sheet material and engaging with each other and/or one or more other members at or beyond the sides of the heat-recoverable sheet material to form the fastening means or part thereof.

The strips are preferably provided throughout their width of and beyond the sides of the opposed edge regions so that they extend out from the sides of the wrap-around sleeve. The strips may be bonded to the regions, for example, by peroxide after the heat-recoverable sheet has been crosslinked or by heat-sealing before crosslinking or may be positioned, loosely or otherwise, in loops formed at these regions. Such loops can be formed by folding and, preferably bonding, the sheet material, for example by ultra-sonic welding or, in some cases, a wide tubular sleeve of heat-recoverable sheet material may be flattened effectively to form a dual-walled sheet with edge loops.

Attention is drawn in this respect to co-pending application Ser. No. 971,260 inventors B. Lagardere and R. Sovish, filed today claiming priority from British patent application No. 53703/77, which describes wrap-around devices which are designed to conform to the surface of a substrate so as to avoid protuberances and, more especially describes wrap-around devices in which the fastening is effected by means of loops and folds provided in the heat-recoverable sheet material.

The strips of relatively rigid material provided in accordance with the present invention lie substantially in, or parallel to, the plane of the heat-recoverable material. They may be resilient and/or deformable but their width and strength is preferably such that they do not bend significantly in the plane of the sheet during recovery. In this way they act to prevent "bowing," i.e. the formation of gaps in the join between the two ends of the sheet. However, in certain cases it may be advantageous to provide means for securing them together at discrete intervals across the width of the sheet.

In many cases, the strips will be flat, at least across their width, but, as explained hereinafter, it may in some cases be advantageous to give them an initial bent configuration which converts to a flat configuration during recovery.

In other applications the strips may advantageously be deformable along their length, not only so as to facilitate engagement at their ends, as hereinafter described, but also so that they can accommodate a so-called "step-down" joint where the wrap-around device is used to form a closure around a join between, for example, two cables of different diameter.

One important advantage of the wrap-around members of the present invention is that not only do the relatively rigid strips co-operate to accommodate a substantial proportion of the force exerted on the joined edges of the sheet during recovery but also they generally strengthen the edges. One quite common effect noted in wrap-around sleeves is that the central portion of the overlapping edge region tends to bow outwardly away from the underlying sheet and leave a potential route for the ingress of moisture and other contaminants. Even where the nature of the fastening means is such that the sheets cannot become separated in this manner the tendency may lead to a buckled join and, in some cases, to the appearance of gaps elsewhere. This bowing effect is substantially eliminated by the provision of the relatively rigid strips in accordance with the present invention. In this respect, the strengthening effect against bowing may, if desired, be enhanced by using strips which are bent, across their width and/or along their length. By correct choice of the configuration of the strips it is therefore possible to obtain a uniform fastening without undesired buckling, even with sleeves of large diameter.

The strips may be fastened together prior to recovery by one or more further fastening members, which members will, in general, be positioned beyond the sides of the wrap-around sleeve. Of course, the strips may form part of a single unit which may be provided with in-built fastening means. Such a unit might resemble, for example, a safety pin made from flat metal sheet.

Preferably, however, the strips co-operate themselves to form the fastening means without the use of further members. In one especially preferred embodiment each strip protrudes or has an element which protrudes beyond the longitudinal edge of the wrap-around sleeve. When the opposing edge regions of the heat-recoverable sheet are over-lapped to form a closure the protruding portion of the lowermost strip at each side of the wrap-around assembly is then bent upwardly and, preferably, back over the outer surface of the sleeve. When, during recovery or before, the sleeve attempts to adopt a lesser diameter, the bent over portions come into contact with the protruding portions of the uppermost strip and prevent further movement of the sleeve. The or each protruding portion at a longitudinal edge may be provided with means which assist location of the strips, such, for example, as a groove or slot into which the other strip fits.

It will also be appreciated that the protruding portion of the uppermost strip could be bent downwardly and, preferably, back inside the inner surface of the sleeve in order to obtain the same effect. Equally it would be possible to combine these two portions. However, in general, it will be preferable only to bend the lowermost strip in an upwards direction.

One significant advantage of the present invention is that the shrinkage force is to a large extent accommodated by the abutment of the metal strips, or their fastening means, away from the body of the wrap-around sleeve. This significantly reduces the strain on the heat-recoverable sheet material and, in addition, results in a substantially flat joint. In this respect it will be appreciated that the strips may be, to some extent, deformable so that they can adapt to the surface of the substrate.

The strips may, nonetheless, in some instances be advantageously made from a resilient material. This is the case, for example, when the strips are slightly bent along their length in order to reduce or eliminate the bowing effect referred to earlier.

In some especially preferred embodiments the strips are so designed that they overlap as well as abut so as to produce a strong uniform join across the width of the sleeve.

The strips may be made from any relatively rigid material, but in general will be made from a metal. It is especially preferred that the metal should be thermally conductive because this brings the added advantage that the strips help to distribute the heat applied during recovery uniformly across the join. In some cases it may even be advantageous to employ electrically conductive strips which can then be used as heating elements during recovery.

In other embodiments, the strips may themselves form part of an electrical connection. Attention is drawn in this respect to co-pending application Ser. No. 971,261 filed today claiming priority from British patent application No. 53702/77, inventor B. Lagardere, now abandoned which describes wrap-around devices in which the fastening means forms part of an electrical connection to a substrate.

In certain embodiments, for example where the shrinkage forces are low or where the heat-recoverable sheet material is relatively thick, it may be possible to shape the heat-recoverable sheet material itself to provide the necessary fastening means. In the extreme it would even be possible to dispense with both strips so that the fastening is effected between the ends of the heat-recoverable sheet. For example, protruding portions of the heat-recoverable sheet material itself could be folded under its main surface at each edge of one end region so as to provide the necessary abutment with similar protruding portions on the other region. The recovery forces would then operate to keep the folded under portions in position.

It will also be appreciated that, in some embodiments, it may be advantageous to embed the strips in the ends of the heat-recoverable sheet material.

Depending on the application concerned, the heat-recoverable sheet material can be made from any of the polymers known from the art to be useful for the production of heat-recoverable articles. Generally the sheet material will be of constant composition throughout; however laminates of two different polymers bonded or fused together may be used in certain instances. Amongst suitable polymers there may be mentioned, for example, polyolefins, especially polyethylene, copolymers of ethylene and vinyl acetate, copolymers of ethylene and ethyl acrylate; chlorinated and fluorinated polymers, especially polyvinyl chloride, polyvinylidene fluoride and polymers incorporating units from vinylidene fluoride, hexafluoroethylene and chlorotrifluoroethylene; and rubbers such as ethylene/propylene rubber, chlorinated rubbers, e.g. Neoprene, and silicone rubbers which may be used in a blend with a crystalline or galssy polymer such as an olefin polymer. All of the above materials may, if desired, be crosslinked for example by irradiation and/or chemical means.

In certain applications, the internal surface of the wrap-around sheet material may, of course, be provided with a coating of an adhesive or a sealant such as a hot-melt adhesive or a mastic. Especially suitable hot-melt adhesives include, for example, polyamides, ethylene/vinyl acetate copolymers and terpolymers (with or without incorporated waxes) and polyesters. Such materials are described, for example, in British Pat. No. 1,440,810 and German OS No. 2,709,717. Also suitable are curable adhesives which melt and flow on heating but which will not afterwards be hot-meltable. There may also be mentioned epoxy resins and conventional mastics such, for example, as those based on butyl and isobutylene rubbers modified with suitable materials known in the art. Obviously the use or otherwise of such materials and their type, if chosen, will depend upon the particular requirements in any given case.

Various embodiments of the present invention will now be described, by way of example only, with reference to the accompanying drawings, in which FIGS. 1a to 1d illustrate one form of wrap-around closure and fastening means in accordance with the present invention;

FIGS. 2a to 2d illustrate a further form of wrap-around closure and fastening means in accordance with the present invention;

Figure 1A:
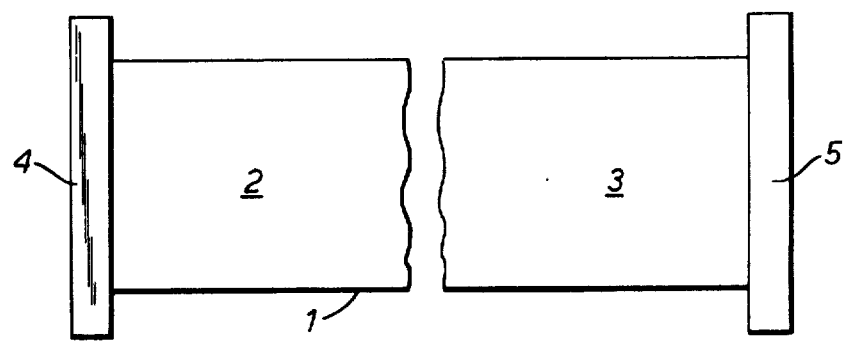

Referring now to the drawings, in FIG. 1a there is shown a length of heat-recoverable sheet material 1 provided at its end regions 2 and 3 with metal strips 4 and 5 respectively, which extend along and beyond the width of the end regions 2 and 3. The strips 4 and 5 which may, for example, be made from aluminium, copper or steel are, in this instance, bonded to the surface of the heat-recoverable sheet material. As shown, they are both bonded to the upper surface, but it would, of course, be possible for one or both of them to be bonded to the lower surface.

Figure 1B:
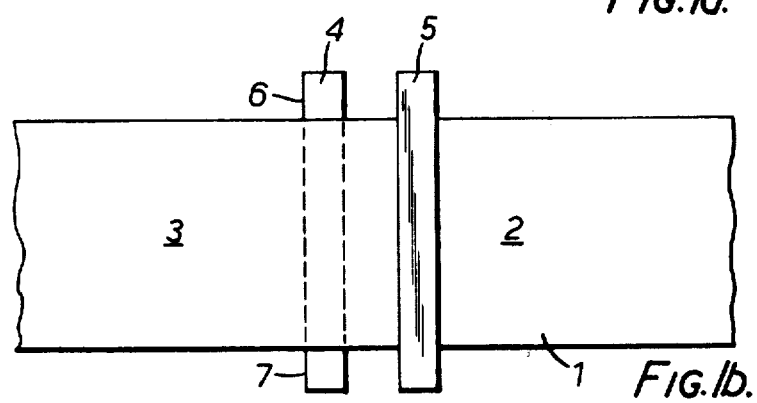
Figure 1C:
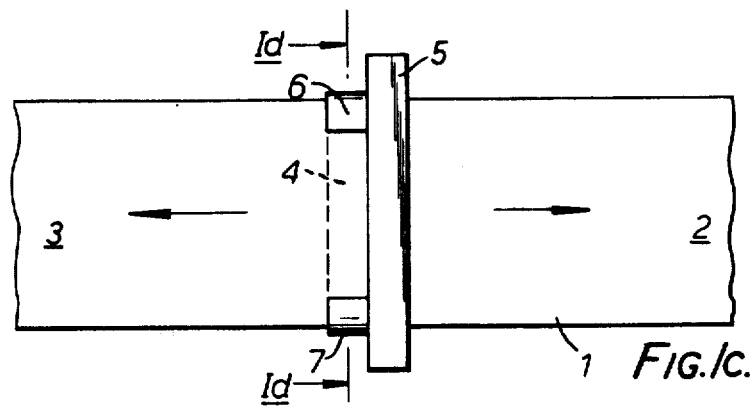
Figure 1D:
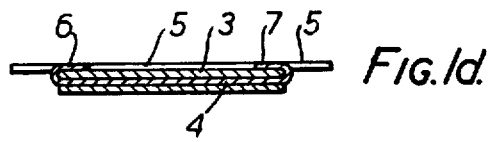

FIG. 1b shows the position when the sheet 1 has been wrapped about a substrate to form a wrap-around sleeve. As shown, the ends 2 and 3 are in overlapped relationship. In accordance with the present invention, the protruding ends 6 and 7 of the lowermost strip 4 are now bent upwardly and over the upper surface of the sheet 1 at end 3 so that the position shown in FIG. 1c is reached. As perhaps can be seen more clearly from FIG. 1d which is a cross-section taken along the dotted line of FIG. 1c the bent over portions 6 and 7 of strip 4 contact strip 5 and thus prevent further movement of the ends 2 and 3 in the directions shown by the arrows.

It can be seen, therefore, that by this relatively simple arrangement there is provided a strong but effective fastening means which will enable the wrap-around sleeve to be recovered about the substrate.

The wrap-around sleeve shown in FIGS. 2a to 2d operates on a somewhat similar principle. In this case the heat-recoverable sheet 11 is provided at its end regions 12 and 13 with two metal strips 14 and 15, respectively. Strip 14 is positioned slightly inwardly from the far end of region 12 so as to provide an overlapping portion 16 to facilitate the formation of a good seal at the join.

In this case, strip 15 is provided with two slots 17 and 18 which are designed to accommodate the bent over end portions 19 and 20 of strip 14 when the wrap-around sleeve is formed as shown in FIGS. 2b and 2c. As can be seen best from FIG. 2c, the strips 14 and 15 overlap when they come into abutment and, once again, the abutment of bent over edges 19 and 20 with strip 15 ensures that, on recovery, a reliable join is made and that there is no further movement in the direction shown by the arrows. FIG. 2d which is the section taken along the dotted line of FIG. 2c shows that the strips 14 and 15 are each slightly bent along their length so as to counteract the bowing effect referred to earlier.

Figure 3A:
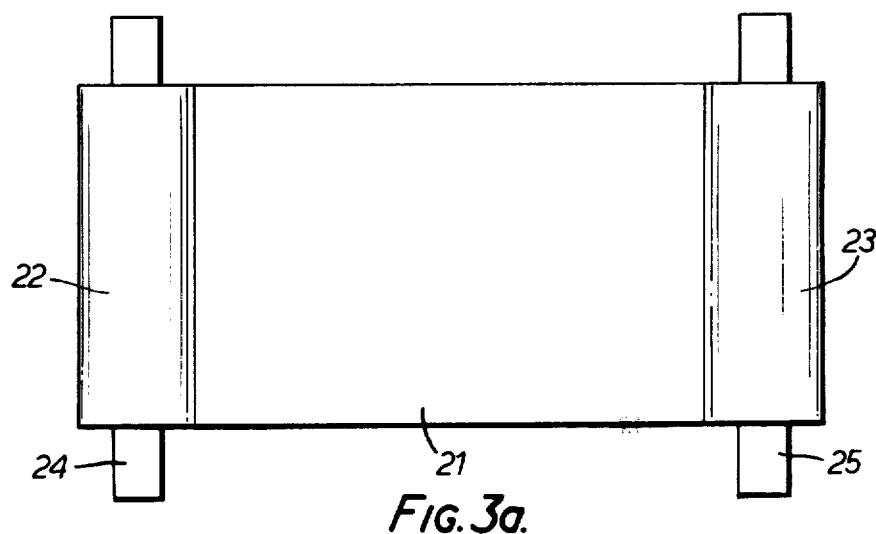
FIGS. 3a and 3b show an alternative form of wrap-around sleeve according to the present invention.
Figure 3B:
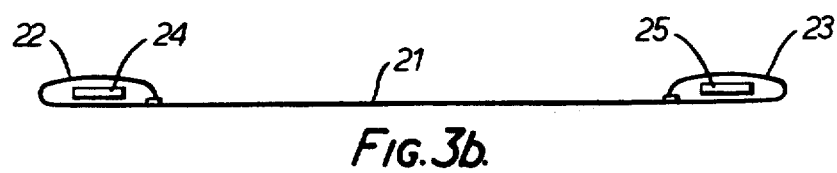

In FIGS. 3a and 3b there is shown a wrap-around closure member similar to that shown in FIG. 1 except that in this instance the heat-recoverable sheet material 31 is provided with terminal end loops 22 and 23 in which are positioned metal strips 24 and 25, respectively. The advantage of this arrangement is that it is relatively easy to form the sheet 21 in a continuous form and, therefore, it may be provided as a roll from which the customer cuts the desired width according to his application. In the same way, strips 24 and 25 may be cut to the desired length from a roll of strip material.

Figure 4:
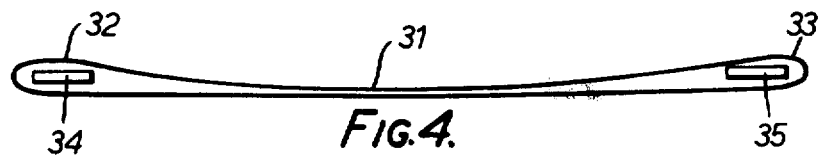
FIG. 4 shows a variation of a sleeve of the type shown in FIGS. 3a and 3b.

FIG. 4 shows how a similar arrangement can be obtained by flattening a continuous tubular sleeve 31 of heat-recoverable material so as to form effective terminal loops 32 and 33 in which metal strips 34 and 35 respectively are located. If the inner surface of the sleeve 31 is provided with a hot melt adhesive the final recovered product will be a dual-walled wrap-around sleeve.

Figure 5:
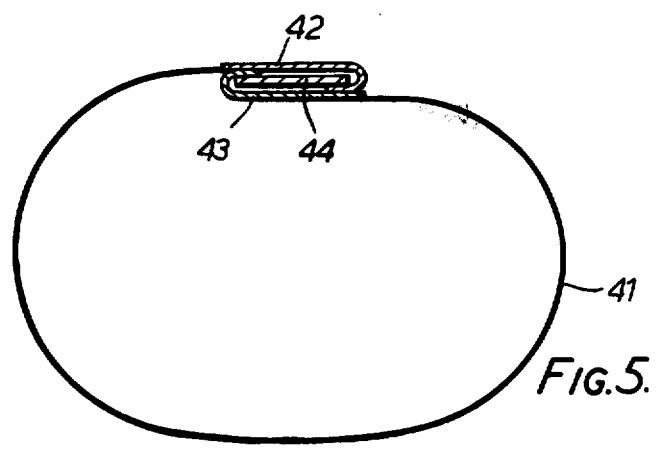
FIG. 5 shows a further form of wrap-around sleeve according to the present invention.

FIG. 5 shows a further form of wrap-around sleeve 41 in accordance with the present invention in which the strips 42 and 43 are formed as clasps and a flat rod 44 of metal or other rigid material is provided to complete the fastening means.

Further modifications falling within the scope of the present invention will be apparent to those skilled in the art.

I claim:

1. A heat-recoverable wrap-around device made from heat-recoverable sheet material, wherein two opposed edge regions of the sheet material which are securable together by a fastening means to form a sleeve prior to recovery are each provided with a strip of relatively rigid material, the strips lying generally in the plane of the heat-recoverable sheet material and having end portions extending beyond the sides of the sheet material which end portions are capable of being engaged with each other and/or one or more other members at or beyond the sides of the heat-recoverable sheet material to form the fastening means thereof.

2. A heat-recoverable wrap-around device as claimed in claim 1, wherein the strips are bonded to the heat-recoverable sheet material.

3. A heat-recoverable wrap-around device as claimed in claim 1, wherein the strips are positioned within loops in the heat-recoverable sheet material.

4. A heat-recoverable wrap-around device as claimed in claim 3, wherein the loops are formed by folding back the sheet material.

5. A heat-recoverable wrap-around device as claimed in claim 4, wherein the loops are secured by bonding.

6. A heat-recoverable wrap-around device as claimed in claim 3, wherein the loops are formed by flattening a heat-recoverable tube to form a dual-walled sheet.

7. A heat-recoverable wrap-around device as claimed in claim 1, wherein the strips are made from a resilient material.

8. A heat-recoverable wrap-around device as claimed in claim 1, wherein the strips are made from a deformable material.

9. A heat-recoverable wrap-around device as claimed in claim 1, wherein the strips are substantially flat.

10. A heat-recoverable wrap-around device as claimed in claim 1, wherein the strips are bent across their width.

11. A heat-recoverable wrap-around device as claimed in claim 1, wherein the strips are bent along their length.

12. A heat-recoverable wrap-around device as claimed in claim 1, which comprises means for fastening the strips together prior to recovery.

13. A heat-recoverable wrap-around device as claimed in claim 12, wherein the strips are provided with in-built fastening means.

14. A heat-recoverable wrap-around device as claimed in claim 13, wherein the two strips form part of a single unit.

15. A heat-recoverable wrap-around device as claimed in claim 14, wherein the single unit functions as a safety pin.

16. A heat-recoverable wrap-around device as claimed in claim 1, wherein the strips co-operate with each other to form the fastening means without the use of further members.

17. A heat-recoverable wrap-around device as claimed in claim 16, wherein the opposed edge regions are overlapped to form a sleeve such that one of said opposed regions and the strip affixed thereto are innermost said sleeve and the end portions of the innermost strip on each side of the wrap-around assembly have been bent toward the outer surface of the heat-recoverable sleeve.

18. A heat-recoverable wrap-around device as claimed in claim 17 wherein the end portions have been bent toward and back over the outer surface of the heat-recoverable sleeve.

19. A heat-recoverable wrap-around device as claimed in claim 17, wherein the end portions of the strip at one or both edge region(s) are provided with means for locating the strip at the opposed edge region.

20. A heat-recoverable wrap-around device as claimed in claim 19, wherein said means comprises a groove or slot into which the other strip fits.

21. A heat-recoverable wrap-around device as claimed in claim 1, wherein the strips are so designed that they overlap as well as abut to form the fastening means.

22. A heat-recoverable wrap-around device as claimed in claim 1, wherein the strips are made from a metal.

23. A heat-recoverable wrap-around device as claimed in claim 22, wherein the metal is thermally conductive.

24. A heat-recoverable wrap-around device as claimed in claim 22, wherein the metal is electrically conductive.

25. A heat-recoverable wrap-around device as claimed in claim 1, wherein the width and strength of the strips is such that they can withstand the recovery forces and avoid the formation of a gap in the join between the opposed edge regions.

26. A heat-recoverable wrap-around device as claimed in claim 1, wherein the strips are deformable along their length so as to accommodate substrates of changing diameter.

27. A heat-recoverable wrap-around device as claimed in claim 1, wherein the strips are embedded in the heat-recoverable material.

28. A heat-recoverable wrap-around device as claimed in claim 1, wherein at least one of the strips is made from the heat-recoverable material itself.

29. A method of making a wrap-around connection to a substrate, wherein there is used a heat-recoverable wrap-around device as claimed in claim 1.

* * * * *